United States Patent [19]

Morrissette

[11] 4,416,080
[45] Nov. 22, 1983

[54] FISH LURE WITH AN OVERLAY

[76] Inventor: Lawrence E. Morrissette, 340 Bd des Ecoles, 83140 Six-Fours-Plage, France

[21] Appl. No.: 314,962

[22] Filed: Oct. 26, 1981

[51] Int. Cl.³ .............................................. A01K 85/00
[52] U.S. Cl. ................................... 43/42.2; 43/42.31; 43/42.46
[58] Field of Search ............... 43/42.2, 42.21, 42.31, 43/42.36, 42.39, 42.46, 42.09

[56] References Cited

U.S. PATENT DOCUMENTS

| | | | |
|---|---|---|---|
| D. 230,733 | 3/1974 | Morrissette | D22/05 |
| D. 230,734 | 3/1974 | Morrissette | D22/05 |
| 779,744 | 1/1905 | Shakespeare, Jr. | 43/42.36 |
| 1,989,850 | 2/1935 | Dorsey | 43/42.39 |
| 2,306,692 | 12/1942 | Flood | 43/42.39 |
| 2,518,031 | 8/1950 | Lane | 43/42.31 |
| 2,574,293 | 11/1951 | Sabin et al. | 43/42.36 |
| 2,587,366 | 2/1952 | Montali | 43/42.2 |
| 2,606,387 | 8/1952 | Garner . | |
| 2,653,409 | 9/1953 | Hancock . | |
| 2,674,823 | 4/1954 | Gellings . | |
| 2,804,713 | 9/1957 | Johnson | 43/42.2 |
| 3,494,063 | 2/1970 | Treaster | 43/42.31 |

FOREIGN PATENT DOCUMENTS

| | | | |
|---|---|---|---|
| 754278 | 8/1956 | United Kingdom | 43/42.21 |

*Primary Examiner*—Nicholas P. Godici
*Assistant Examiner*—Kurt C. Rowan
*Attorney, Agent, or Firm*—Schroeder, Siegfried, Vidas & Arrett

[57] ABSTRACT

A fishing lure with a main body as a tapered fluted screw and a metal journal insert for weight and vibration through the longitudinal axis. A shaft runs through the insert to provide line and hook attachment at the ends. A shiny metal overlay is loosely mounted on the shaft on each end of the main body, with the loose fit over one vane surface providing higher vibration and slower rotation due to the fit and off-balance of the lure.

8 Claims, 7 Drawing Figures

Fig. 1
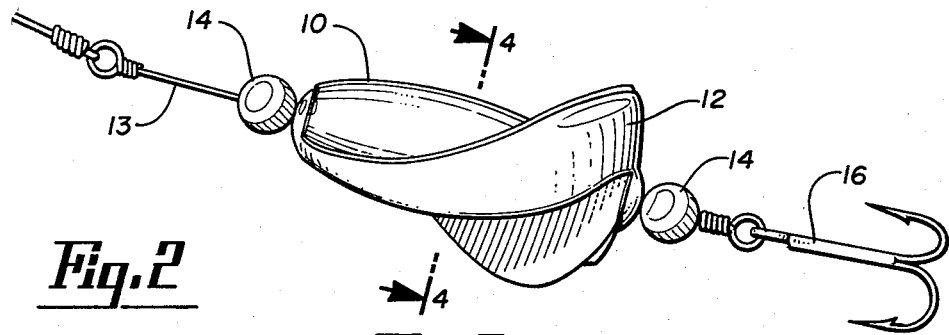
Fig. 2
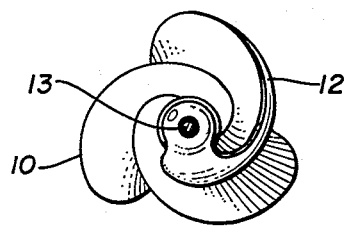
Fig. 3
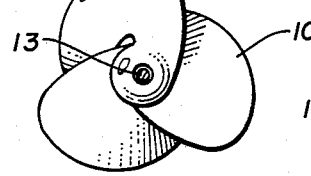
Fig. 4
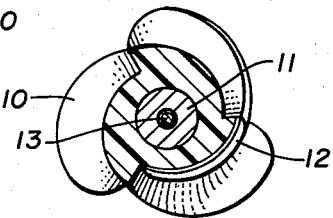
Fig. 5
Fig. 6
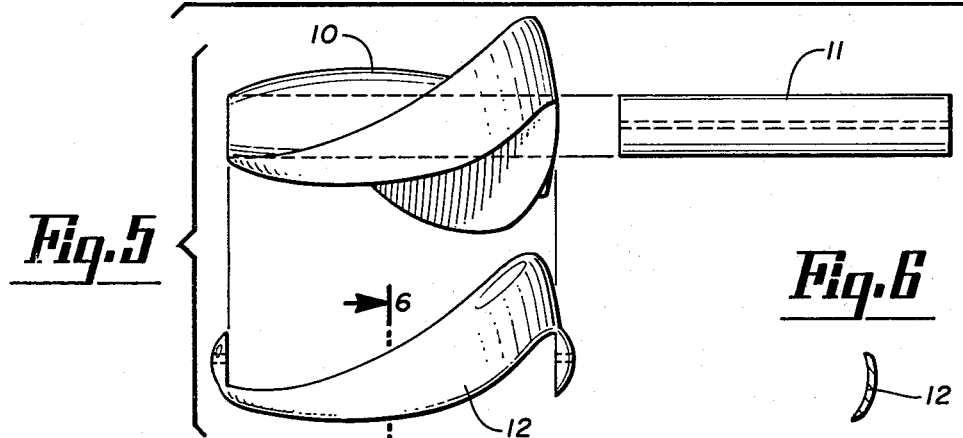
Fig. 7
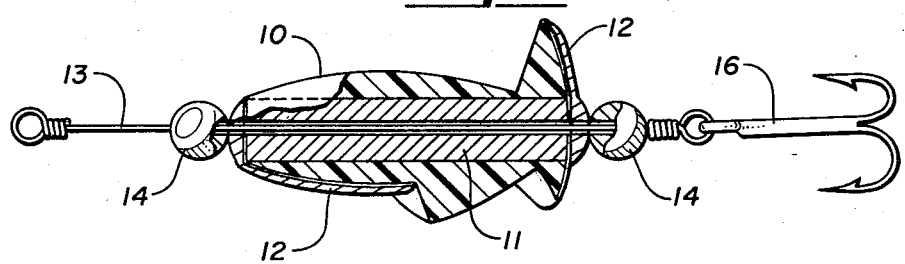

FISH LURE WITH AN OVERLAY

BACKGROUND OF PRIOR ART

Fishing lures have been used for many years as an alternative means to using live bait. Fish are attracted to lures by sight and sound by virtue of the construction of the lures. My U.S. Pat. Nos. Des. 230,733 and 230,744 are the most pertinent art known to me relating to fishing lures.

BRIEF SUMMARY OF INVENTION

The present invention has a tapered fluted screw as a main body with a bore through its longitudinal axis. A wire shaft is then inserted through the bore with a closed loop on one end to attach line and on the other end to attach a hook. The screw shape causes a very high rate of rotation as the lure is pulled through the water, or when traveling in a heavy current. A shiny metal overlay loosely following one external surface of the screw is attached to the wire shaft on each end of the screw. The addition of the metal overlay makes the entire lure off-balance, which tends to slow down the rotation, which is desirable. Another effect is that the gap between the metal overlay and the surface of the screw provides a vibration that attracts the fish and also provides a flutter. The flutter makes a shiny reflection which attracts fish visually, while the vibration produced also attracts fish audibly.

The bore through the longitudinal axis of the screw in the lure is enlarged to insert a metal journal held in place by a bead on the shaft of each end. One function of this metal journal is to provide extra weight for greater accuracy and distance in casting. Another function is to provide a harmonious vibration as the metal journal turns on the wire shaft, which in combination with the vibration from the metal overlay, audibly attracts the fish.

BRIEF DESCRIPTION OF DRAWINGS

A detailed description of one preferred embodiment of my invention is hereafter described with particular reference being made to the drawings in which:

FIG. 1 is a side elevational view of the fishing lure;
FIG. 2 is a front end elevational view of the same;
FIG. 3 is a rear end elevational view of the same;
FIG. 4 is a cross-sectional view of the same through line 4—4 in FIG. 1;
FIG. 5 is an exploded view of the main body, metal insert and overlay of the same;
FIG. 6 is a cross section of the overlay through line 6—6 of FIG. 5; and
FIG. 7 is a side elevational view of the same with portions broken away to show same in section.

DETAILED DESCRIPTION OF INVENTION

The invention is that of a fishing lure which has substantially improved effectiveness as a result of vibrations and sounds created thereby and is particularly suited for accurate, long-distance casting although not limited to that purpose. Referring to FIGS. 1 thru 7, it will be seen that the main body is a tapered fluted screw 10 with a bore drilled or molded therethrough at its longitudinal axis. A wire shaft 13 extends through the main body to provide attachment means to the hook 16 and line. The screw shape 10 causes rapid rotation as it is pulled through the water. The taper preferably widens to the rear, hook end which adds weight to that end and counters the tendency a current has to raise the rear of the lure. It also substantially reduces the likelihood of entanglement with the line.

It has been found that the use of a metal overlay 12 on the exterior of one of the vanes of main body 10 creates an off-balance to the lure which slows the rotation down to a more desirable level. If the metal overlay 12 is attached to the wire shaft 13 on either end so as to have a loose fit on the vane of main body 10, water passes therebetween, vibrating the entire lure and providing an audible attraction to fish. If the exterior of the metal overlay 12 is highly polished, the reflected surface, when vibrating and rotating as it is pulled through the water, attracts fish visually. The metal overaly 12 also adds weight to the lure and provides greater accuracy in casting and longer distance.

To provide greater weight, the main body 10 may be formed with a greater diameter longitudinal bore through which a metal journal 11 may be inserted. When mounted on the wire shaft, this would provide additional weight for casting, and, due to the rotation of the screw 10 and vibration from the metal overlay 12, it would also vibrate as it turns on the shaft 13. A bore diameter of 1 mm in the metal journal and a bore diameter of 5 mm in the main body has been found to be preferable. The metal of the journal 11 may be of any suitable type with its density determining the depth and range of the lure. Lead may be utilized when in heavy current to provide the necessary weight to keep the lure at the proper depth, counterbalancing the tendency to lift by the current. The combined vibrations of the metal overlay and the metal journal resemble natural insect sounds to attract fish.

A pearl bead 14 is attached to the shaft 13 on each end of the main body 10 to prevent line fouling and hook fouling and to lock the main body 10, metal overlay 12 and metal insert 11 together on the shaft once the loops are formed on the ends of the wire shaft 14.

In operation, the lure rotates through the water giving off flashes of light from the shiny metal overlay while at the same time creating vibrations caused by the loose mounting of the metal overlay upon the main body and by the turning of the metal journal. Thus, both means positively attract fish by sound and sight, to provide an improved lure.

In considering this invention, it should be remembered that the present disclosure is illustrative only and the scope of the invention should be determined by the appended claims.

I claim:
1. A fish lure comprising:
   (a) a main body of a tapered, fluted screw with a bore through its longitudinal axis;
   (b) a shaft extending through said bore;
   (c) line connector means on said shaft on the narrow, forward end of said tapered screw;
   (d) hook connector means on said shaft on the wide, rear end of said tapered screw; and
   (e) an overlay secured to and extending longitudinally along said screw in spaced and unbalancing relation thereto, said overlay being constructed and arranged to cause said screw to be unbalanced and vibrate as it rotates about said shaft and to cause water to pass between said overlay and said screw as the lure is drawn through water.

2. The lure of claim 1 wherein said overlay is mounted to each end of said screw and pierced by said shaft.

3. The lure of claim 1 wherein said overlay extends along only one of the flutes of said screw.

4. The lure of claim 1 and a metal journal with a bore having substantially greater diameter than said shaft mounted on said shaft in spaced relation thereto and extending throughout the length of said bore, said journal being mounted within said screw in loose-fitting surrounding relation to said shaft.

5. A fishing lure comprising:
   (a) a shaft having line connector means at one of its ends and hook connector means at its opposite end;
   (b) a generally frusto-conically shaped body having an axial bore through which said shaft extends and a plurality of helically arranged flutes forming fluted surfaces in its conical surfaces; and
   (c) an elongated metal overlay extending longitudinally of said body and contoured to at least a portion of the fluted surface of only one of said flutes and connected to said body in overlying spaced relation to said portion of said fluted surface.

6. The structure defined in claim 5 wherein said overlay is constructed and arranged to unbalance said body as it rotates about said shaft to cause the lure to vibrate as it is drawn through water.

7. The structure defined in claim 5 and a metal tube mounted on said shaft in loose-fitting surrounding relation and within said body.

8. The structure defined in claim 5 wherein said body is essentially solid throughout its length except for said bore.

* * * * *